US010191263B2

(12) United States Patent
Hayashi

(10) Patent No.: US 10,191,263 B2
(45) Date of Patent: Jan. 29, 2019

(54) SCANNING MICROSCOPY SYSTEM

(71) Applicant: OLYMPUS CORPORATION, Hachioji-shi, Tokyo (JP)

(72) Inventor: Shinichi Hayashi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 119 days.

(21) Appl. No.: 15/132,698

(22) Filed: Apr. 19, 2016

(65) Prior Publication Data

US 2016/0320596 A1 Nov. 3, 2016

(30) Foreign Application Priority Data

Apr. 30, 2015 (JP) ................................ 2015-093223

(51) Int. Cl.
*G02B 21/00* (2006.01)

(52) U.S. Cl.
CPC ..... *G02B 21/0032* (2013.01); *G02B 21/0044* (2013.01)

(58) Field of Classification Search
CPC ........................ G02B 21/0032; G02B 21/0044
See application file for complete search history.

(56) References Cited

U.S. PATENT DOCUMENTS 6,028,306 A * 2/2000 Hayashi ............ G02B 21/0032 250/235
7,391,565 B2 6/2008 Lauer
7,580,171 B2 8/2009 Uhl et al.
2003/0085335 A1* 5/2003 Almogy ............ G01N 21/8806 250/208.1
2005/0094231 A1 5/2005 Hell et al.
(Continued)

FOREIGN PATENT DOCUMENTS

DE 102007009551 B3 8/2008
DE 102013005563 A1 10/2014
(Continued)

OTHER PUBLICATIONS

Japanese Office Action dated Jan. 30, 2018 issued in counterpart Japanese Application No. 2015-093223.
(Continued)

*Primary Examiner* — Behrooz M Senfi
(74) *Attorney, Agent, or Firm* — Holtz, Holtz & Volek PC

(57) ABSTRACT

A scanning microscopy system includes a photodetector and a scanning optical system that irradiates light onto a plurality of spots on an observed object to scan the observed object such that a positional relationship between an image of the observed object and the photodetector is maintained. The scanning optical system includes a confocal plate in which a plurality of apertures are placed in order in an intermediate image plane situated between the observed object and the photodetector and that includes a lens array having a plurality of lens elements that cover the plurality of apertures. The lens array individually demagnifies intermediate images of the plurality of spots that are formed or that have been formed in the plurality of apertures such that each of the plurality of spots is projected onto the photodetector at a magnification lower than a magnification at which the observed object is projected onto the photodetector.

19 Claims, 13 Drawing Sheets

(56) References Cited

U.S. PATENT DOCUMENTS

| | | | | |
|---|---|---|---|---|
| 2005/0094261 | A1 | 5/2005 | Hell et al. | |
| 2005/0141082 | A1* | 6/2005 | Yoshida | G02B 21/0056 359/370 |
| 2007/0146869 | A1 | 6/2007 | Lauer | |
| 2008/0218849 | A1 | 9/2008 | Uhl et al. | |
| 2010/0314533 | A1* | 12/2010 | Stallinga | G02B 21/0032 250/234 |
| 2011/0090553 | A1 | 4/2011 | Kei | |
| 2012/0081535 | A1* | 4/2012 | Hayashi | G02B 21/0032 348/79 |
| 2013/0201488 | A1* | 8/2013 | Ishihara | G01B 11/24 356/609 |
| 2014/0293037 | A1 | 10/2014 | Kleppe et al. | |
| 2015/0131148 | A1 | 5/2015 | Redford | |
| 2015/0234178 | A1 | 8/2015 | Azuma | |
| 2015/0378141 | A1 | 12/2015 | Bathe et al. | |
| 2016/0161728 | A1 | 6/2016 | Sangu | |
| 2016/0238827 | A1 | 8/2016 | Schroff et al. | |

FOREIGN PATENT DOCUMENTS

| | | | |
|---|---|---|---|
| FR | 2826736 | A1 | 1/2003 |
| JP | 08110473 | A | 4/1996 |
| JP | 09133870 | A | 5/1997 |
| JP | 09257440 | A | 10/1997 |
| JP | 2004509370 | A | 3/2004 |
| JP | 2011085759 | A | 4/2011 |
| JP | 2011118070 | A | 6/2011 |
| JP | 2015513671 | A | 5/2015 |
| JP | 2015152836 | A | 8/2015 |
| JP | 2016509692 | A | 3/2016 |
| JP | 2016110056 | A | 6/2016 |
| WO | 2013126762 | A1 | 8/2013 |

OTHER PUBLICATIONS

Andrew G York, et al., "Instant super-resolution imaging in live cells and embryos via analog image processing", Nature Methods, vol. 10, No. 11, Nov. 2013, pp. 1122-1130.

Andrew G York, et al., "Resolution doubling in live, multicellular organisms via multifocal structured illumination microscopy", Nature Methods, vol. 9, No. 7, Jul. 2012, pp. 749-756.

Claus B. Muller, et al., "Image Scanning Microscopy", Physical Review Letters, May 14, 2010, pp. 198101-1 to 198101-4.

Stephan Roth, et al., "Optical photon reassignment microscopy (OPRA)", Optical Nanoscopy 2013, 2:5, 6 Pages.

* cited by examiner

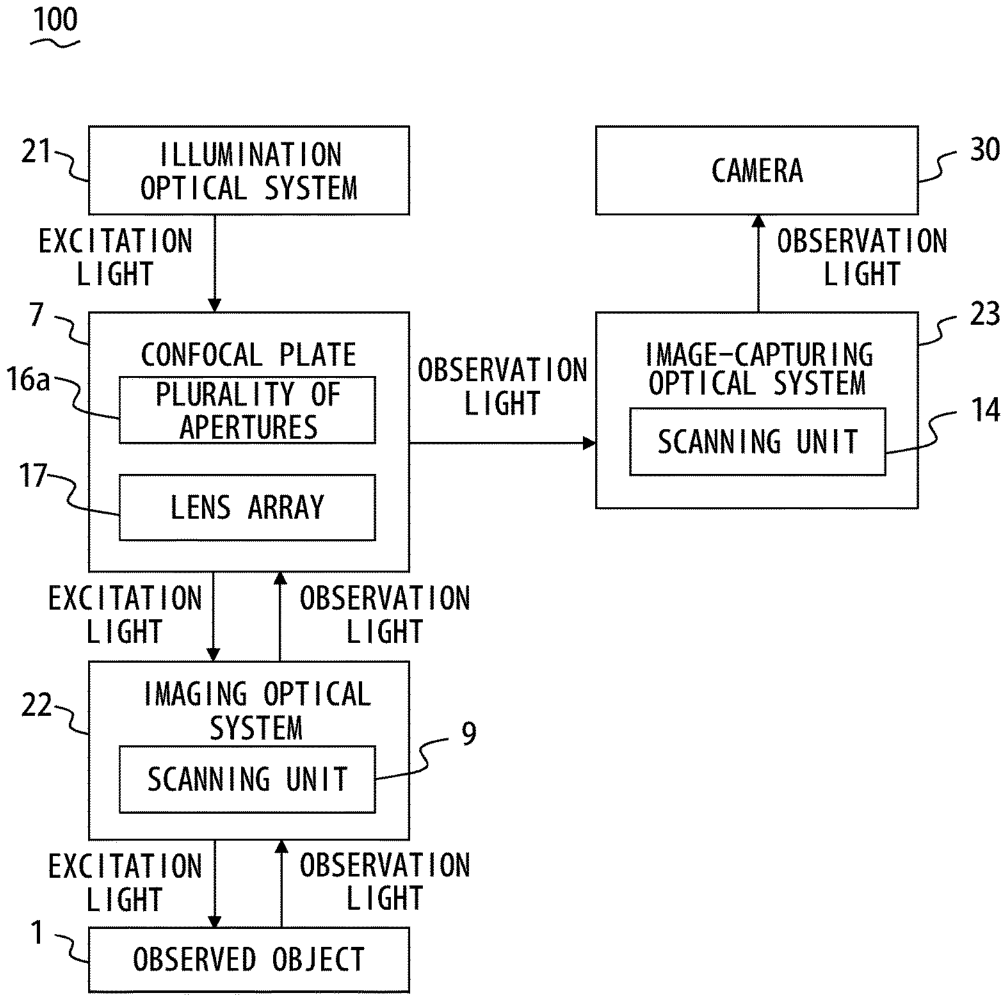
F I G. 2

F I G. 4 A
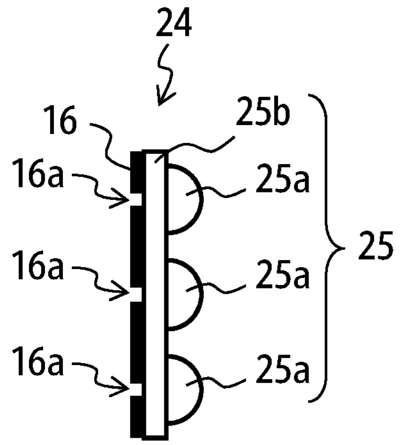
F I G. 4 B
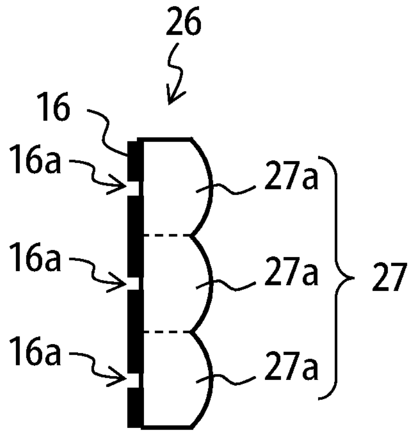
F I G. 4 C
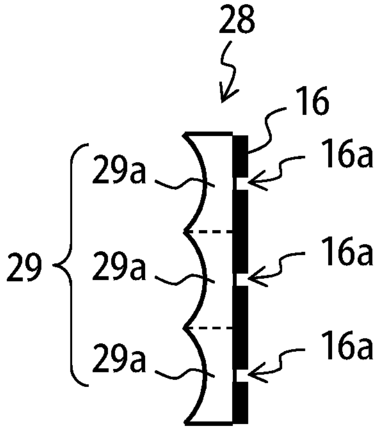

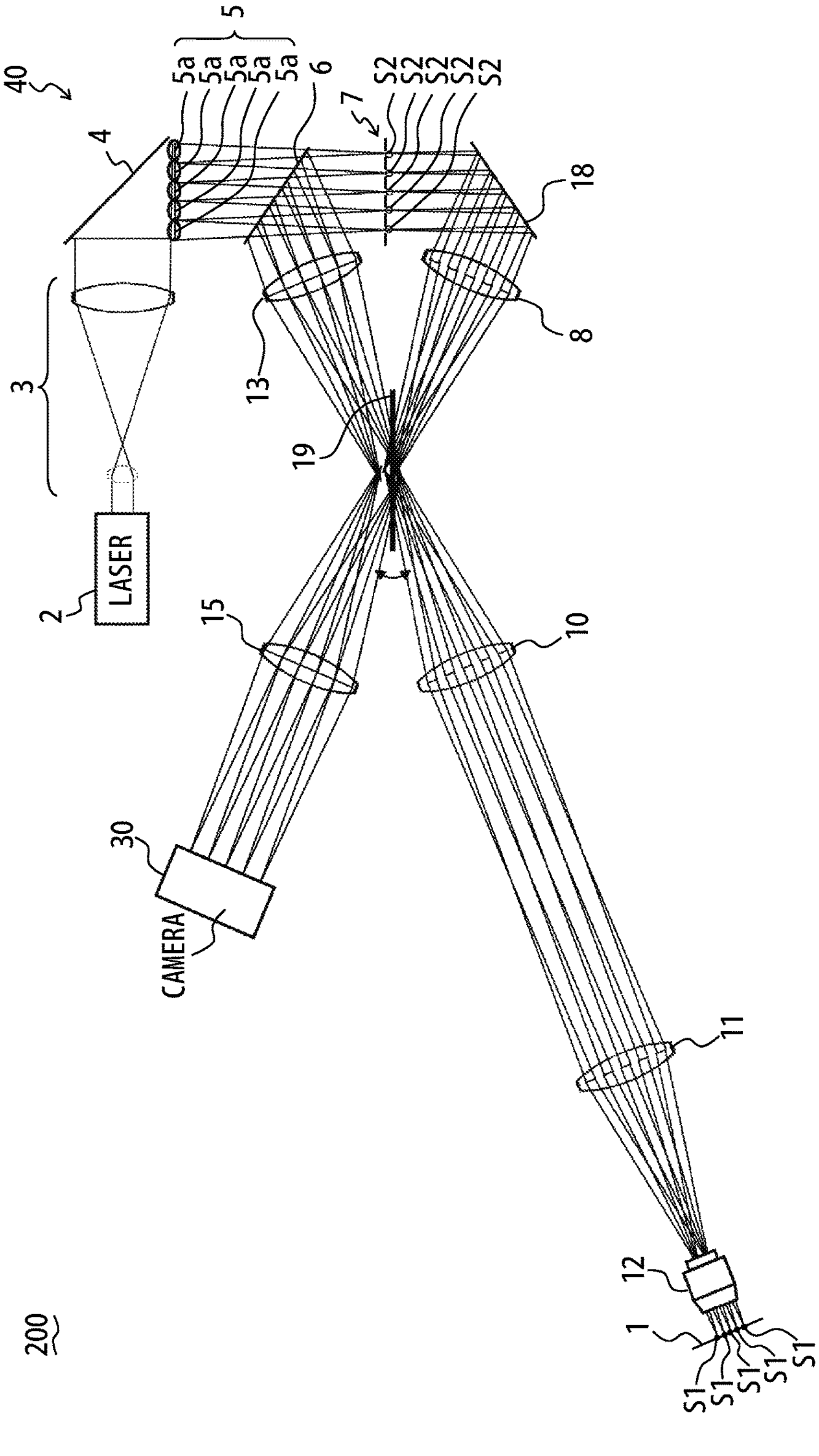
F I G. 5

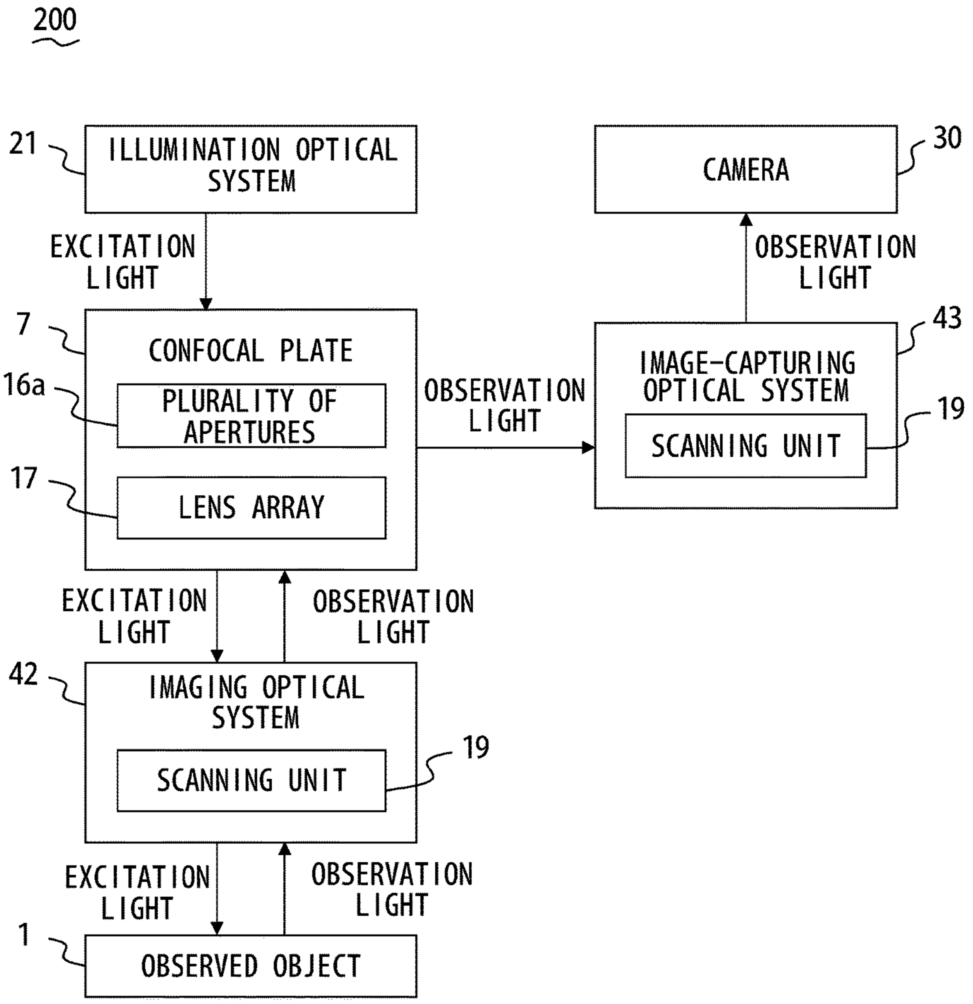
F I G. 6

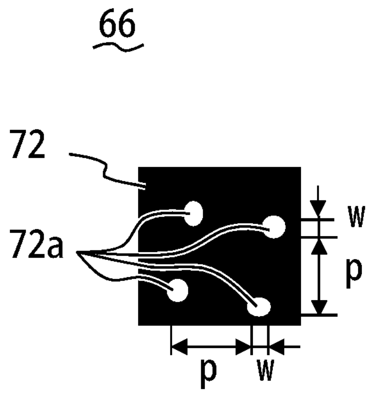
F I G. 8

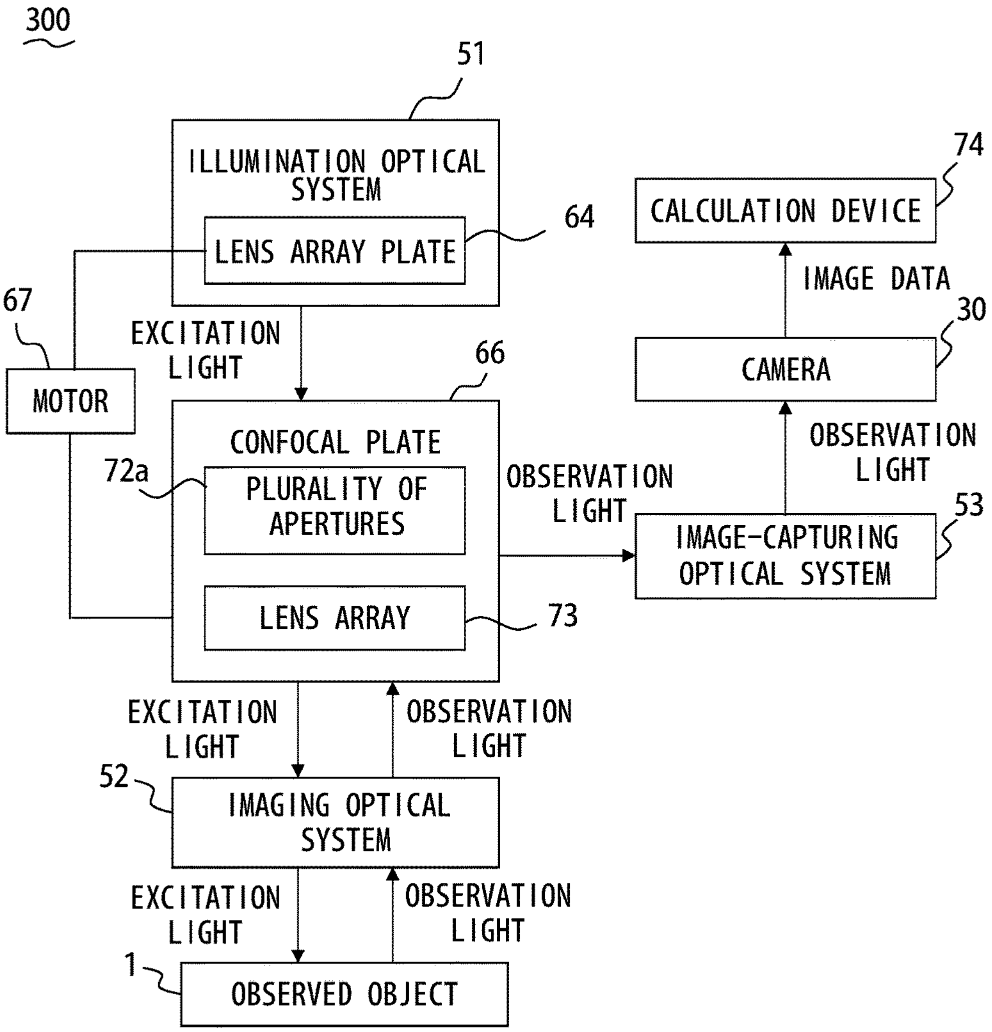
F I G. 1 0

SCANNING MICROSCOPY SYSTEM

CROSS REFERENCE TO RELATED APPLICATIONS

This application is based upon and claims the benefit of priority from prior Japanese Patent Application No. 2015-093223, filed Apr. 30, 2015, the entire contents of which are incorporated herein by this reference.

BACKGROUND OF THE INVENTION

Field of the Invention

The present invention relates to a technology of a scanning microscopy system.

Description of the Related Art

As one of the technologies that have been part of the development of the conventional confocal microscopy in recent years, ISM (image scanning microscopy) in which confocal microscopy is combined with a wide-field detection is known. ISM is a technology that realizes a high resolution and a high detection efficiency at the same time by projecting an optical spot formed on an observed object onto a camera over a plurality of pixels so that an area of each of the pixels functions similarly to a pinhole aperture. A technology related to the ISM is disclosed in, for example, International Publication Pamphlet No. WO 2013/126762.

International Publication Pamphlet No. WO 2013/126762 discloses a multi-focal structured illumination microscopy system. International Publication Pamphlet No. WO 2013/126762 further discloses a technology that projects each optical spot formed on an observed object at a magnification of one-half of the magnification at which the observed object is projected onto a photodetector (that is, a magnification of an image to be scanned). This is a technology used to realize the ISM in a multi-spot-type scanning microscope that scans an observed object with a plurality of optical spots.

SUMMARY OF THE INVENTION

An aspect of the present invention provides a scanning microscopy system including a photodetector that has a plurality of light-receiving elements placed in order on an image surface, and a scanning optical system that irradiates light onto a plurality of spots on an observed object to scan the observed object such that a positional relationship between an image of the observed object and the photodetector is maintained, wherein the scanning optical system includes a confocal plate in which a plurality of apertures are placed in order in an intermediate image plane situated between the observed object and the photodetector and that includes a lens array having a plurality of lens elements that cover the plurality of apertures, wherein the lens array individually demagnifies intermediate images of the plurality of spots that are formed or that have been formed in the plurality of apertures such that each of the plurality of spots is projected onto the photodetector at a magnification lower than a magnification at which the observed object is projected onto the photodetector.

Another aspect of the present invention provides a scanning microscopy system including a photodetector that has a plurality of light-receiving elements placed in order on an image surface, and a scanning optical system that irradiates light onto a plurality of spots on an observed object to scan the observed object such that a positional relationship between an image of the observed object and the photodetector is maintained, wherein the scanning optical system includes a first lens array that has a plurality of first lens elements each of which has a focal plane in an intermediate image plane situated between the observed object and the photodetector, and a second lens array that is arranged in an optical path between the first lens array and the observed object and that has a plurality of second lens elements, wherein the second lens array demagnifies intermediate images of the plurality of spots that are formed or that have been formed in the intermediate image plane such that each of the plurality of spots is projected onto the photodetector at a magnification lower than a magnification at which the observed object is projected onto the photodetector.

BRIEF DESCRIPTION OF THE DRAWINGS

The present invention will be more apparent from the following detailed description when the accompanying drawings are referenced.

FIG. 2 is a block diagram that illustrates a basic configuration of the microscopy system 100 of FIG. 1;

FIG. 4A illustrates a variation of the confocal plate 7;

FIG. 4B illustrates another variation of the confocal plate 7;

FIG. 4C illustrates yet another variation of the confocal plate 7;

FIG. 5 illustrates a configuration of a microscopy system 200 according to a second embodiment of the present invention;

FIG. 6 is a block diagram that illustrates a basic configuration of the microscopy system 200 of FIG. 5;

FIG. 8 illustrates a pattern of apertures formed in a confocal plate 66;

FIG. 10 is a block diagram that illustrates a basic configuration of the microscopy system 300 of FIG. 7;

DESCRIPTION OF THE EMBODIMENTS

In a relay optical system provided between a pinhole array and a detector in a microscopy system, for example, that disclosed in International Publication Pamphlet No. WO 2013/126762, optical elements are used to be aligned with one another with a high accuracy in order to reduce the magnification of each optical spot to one-half of the magnification of an image of an observed object (an image to be scanned). For example, in the microscopy system disclosed in International Publication Pamphlet No. WO 2013/126762, a positional relationship between a plurality of microlens arrays and a pinhole array that configure a relay optical system is used to be adjusted with a high accuracy.

Embodiments of the present invention will now be described.

<First Embodiment>

Figure 1:
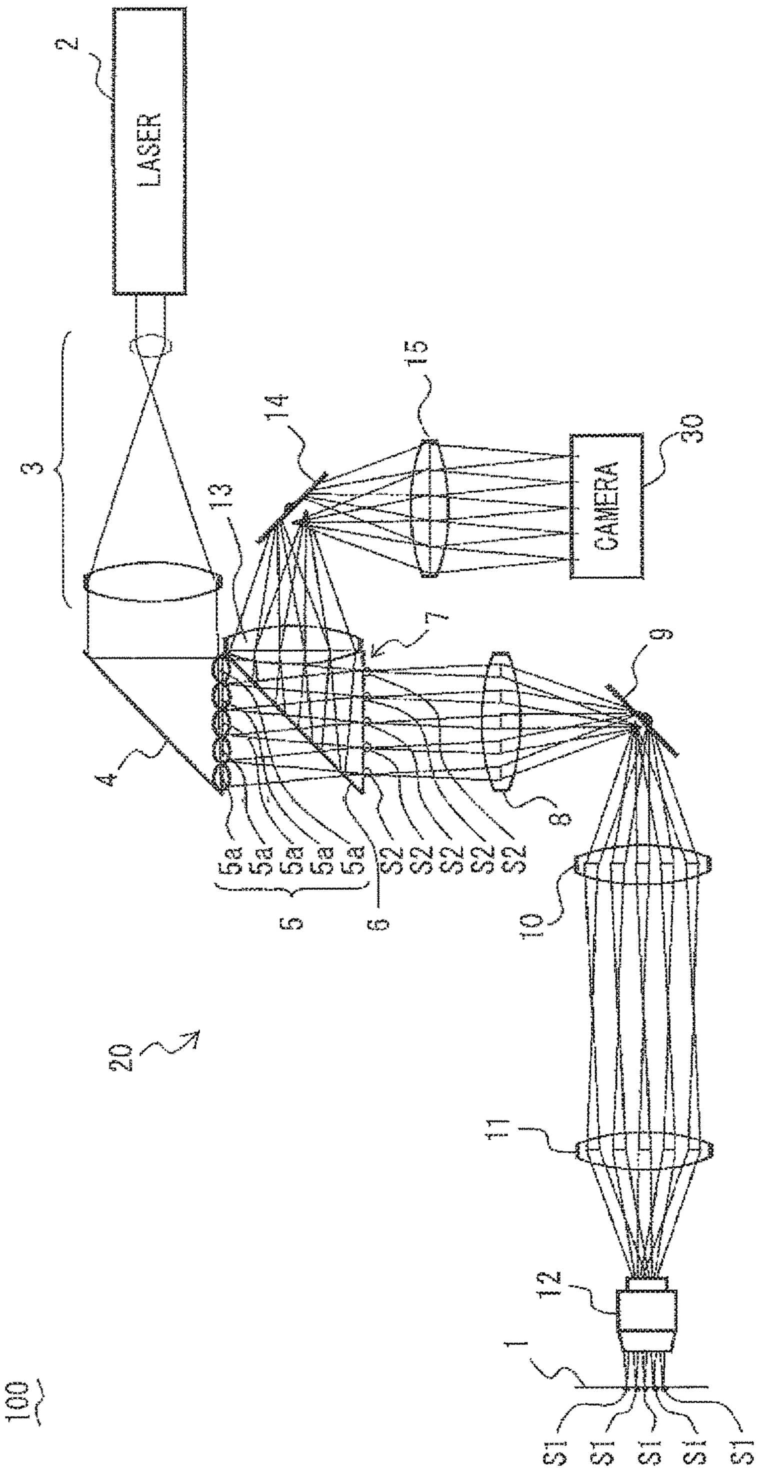
FIG. 1 illustrates a configuration of a microscopy system 100 according to a first embodiment of the present invention.
Figure 3:
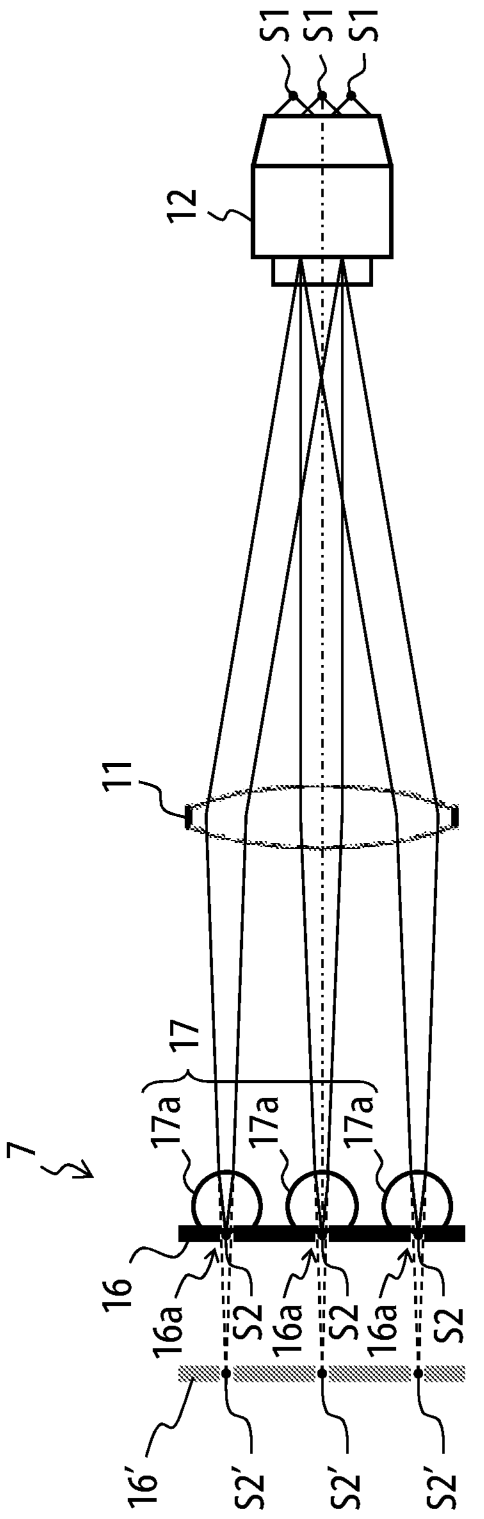
FIG. 3 is a diagram for explaining an action of a lens array 17 included in a confocal plate 7.

FIG. 1 illustrates a configuration of a microscopy system 100 according to the present embodiment. FIG. 2 is a block diagram that illustrates a basic configuration of the microscopy system 100 of FIG. 1. FIG. 3 is a diagram for explaining an action of a lens array 17 included in a confocal plate 7. The microscopy system 100 is a confocal microscopy system that is a form of a laser-scanning microscopy system, and is an image-capturing system that captures an image of an observed object 1 with a high resolving power. The embodiment is described below using, as an example, a case in which the observed object 1 is a biological sample and the microscopy system 100 obtains a fluorescence image of the observed object 1.

The microscopy system 100 includes a scanning optical system 20 that irradiates light onto a plurality of spots (small areas) on the observed object 1 to scan the observed object 1, and a camera 30 that captures an image of the observed object 1. Pieces of fluorescence occur from the plurality of spots with which light is irradiated, as will be described below. In light of this matter, each of the plurality of spots on the observed object 1 with which light is irradiated will hereinafter be referred to as an optical spot that is used as an emission point.

The scanning optical system 20 includes an illumination optical system 21, a dichroic mirror 6, the confocal plate 7, an imaging optical system 22, and an image-capturing optical system 23. The camera 30 includes, for example, a photodetector such as an EM-CCD image sensor, and the photodetector of the camera 30 has a plurality of light-receiving elements (pixels) that are placed in order on an image surface.

The illumination optical system 21 includes a laser 2 that emits excitation light, a beam expander 3 that expands a beam diameter of the excitation light, a mirror 4 that deflects the excitation light, and a lens array 5. The lens array 5 that is arranged between the laser 2 and the confocal plate 7 is a first lens array having a plurality of lens elements 5*a* that have a focal plane in an intermediate image plane situated between the observed object 1 and the camera 30. The lens array 5 is configured to collect the excitation light in a plurality of apertures formed in the confocal plate 7. In other words, the lens array 5 splits the excitation light into a plurality of pieces of excitation light by each of the lens elements 5*a* collecting the excitation light in a corresponding aperture. The intermediate image plane is defined by the imaging optical system 22 and the lens array 17 that is provided in the confocal plate 7.

The dichroic mirror 6 is a splitter for splitting light into an illumination optical path between the laser 2 and the observed object 1 and a detection optical path between the observed object 1 and the camera 30. In this case, the dichroic mirror 6 has the properties of transmitting excitation light and reflecting fluorescence that is observation light occurring from the observed object 1 with which the excitation light is irradiated.

In the confocal plate 7, a plurality of apertures 16*a* are placed in order in the intermediate image plane situated between the observed object 1 and the camera 30. As illustrated in FIG. 3, the confocal plate 7 includes a light shielding plate 16 in which a plurality of apertures 16*a* are formed, and the lens array 17, which has a plurality of lens elements 17*a* that cover the plurality of apertures 16*a*. The light shielding plate 16 is arranged in a focal plane of the plurality of lens elements 5*a*. Each of the plurality of apertures 16*a* is formed in a focal position of a corresponding lens element 5*a*. The lens array 17, which is a second lens array provided between the lens array 5 and the observed object 1, is provided on the light shielding plate 16. The plurality of lens elements 17*a*, which each have a positive power (positive refractive power), are arranged on the object side of the plurality of apertures 16*a*.

The imaging optical system 22 includes a lens 8, a scanning unit 9, a lens 10, a tube lens 11, and an objective 12. The imaging optical system 22 is configured to project the plurality of apertures 16*a* onto the observed object 1 and to form an intermediate image of the observed object 1 on the confocal plate 7. The scanning unit 9 is, for example, a galvanometer mirror that scans the observed object 1 in a plane perpendicular to an optical axis of the imaging optical system 22. The scanning unit 9 is a first scanning unit of the microscopy system 100, which is arranged in an optical path between the confocal plate 7 and the observed object 1.

The image-capturing optical system 23 includes a lens 13, a scanning unit 14, and a lens 15. The image-capturing optical system 23 is configured to project, onto the camera 30, an intermediate image of the observed object 1 that is formed on the confocal plate 7. The scanning unit 14 is, for example, a galvanometer mirror. The scanning unit 14 is a second scanning unit of the microscopy system 100, which is arranged in an optical path between the confocal plate 7 and the camera 30. The scanning unit 9 and the scanning unit 14 operate at the same magnification and at the same speed.

In the microscopy system 100, the excitation light emitted from the laser 2 is converted by the beam expander 3 into a collimated beam having a predetermined beam diameter, and enters the lens array 5 through the mirror 4. In the lens array 5, each of the plurality of lens elements 5*a* collects excitation light that has entered the lens element 5*a* on an aperture 16*a* formed in a focal position of the lens element 5*a*. Accordingly, a plurality of light collection points are formed on the plurality of apertures 16*a* of the lens array 17.

The plurality of apertures 16*a* are projected by the imaging optical system 22 (the lens 8, the scanning unit 9, the lens 10, the tube lens 11, and the objective 12) onto the observed object 1. Accordingly, the excitation light is irradiated onto the observed object 1, and a plurality of light collection points are formed in a plurality of spots on the observed object 1. The scanning unit 9 can change the positions at which the plurality of apertures 16*a* are projected onto the observed object 1. Thus, in the microscopy system 100, the positions at which the plurality of light collection points are formed on the observed object 1 can be changed by controlling the scanning unit 9.

In the observed object 1 with which the excitation light is irradiated, pieces of fluorescence occur from the plurality of spots. In other words, the plurality of spots are a plurality of optical spots S1. The fluorescence that has occurred from each of the optical spots S1 is collected on an aperture 16*a* by the imaging optical system 22 and passes through the aperture 16*a*. At this point, an intermediate image S2 of the optical spot S1 is formed by the lens array 17 on the aperture 16*a*.

The fluorescence that has passed through the aperture 16*a* is reflected onto the dichroic mirror 6 and enters the image-capturing optical system 23. The image-capturing optical system 23 (the lens 13, the scanning unit 14, and the lens 15) projects, onto the camera 30, a plurality of intermediate images S2 formed on the plurality of apertures 16*a*. The scanning unit 14 can change the positions at which the plurality of apertures 16*a* are projected onto the camera 30. Thus, in the microscopy system 100, the positions at which the plurality of intermediate images S2 are projected onto the camera 30 can be changed by controlling the scanning unit 14. Specifically, the scanning unit 14 operates at the same magnification and at the same speed as the scanning unit 9. Thus, the scanning unit 14 functions such that the plurality of intermediate images S2 formed by the scanning unit 9 on the plurality of apertures 16*a* are projected onto the camera 30 in positions corresponding to the positions of the plurality of optical spots S1 regardless of the positions of the plurality of optical spots S1. Therefore, in the microscopy system 100, the scanning optical system 20 including the scanning unit 9 and the scanning unit 14 scans the observed object 1 such that a positional relationship between an image of the observed object 1 and the camera 30 is maintained.

The camera 30 generates confocal image data of the observed object 1 on the basis of an amount of fluorescence detected for a predetermined period of time. A method for generating confocal image data is the same as that in International Publication Pamphlet No. WO 2013/126762. Further, it is also similar in that a resolution of an image may be enhanced by performing deconvolution processing on the generated confocal image data.

Next, an action of the lens array 17 provided in the confocal plate 7 is described with reference to FIG. 3. In FIG. 3, the lens 8, the scanning unit 9, and the lens 10 that are illustrated in FIG. 1 are omitted for convenience of description.

With the positive power of a lens element 17*a*, the lens array 17 forms, in a position closer to an object than an intermediate image S2' (that is, a position closer to the objective 12), an intermediate image S2 obtained by demagnifying the intermediate image S2' to ½, the intermediate image S2' being formed when there does not exist the lens element 17*a*. In FIG. 3, the position of a light shielding plate that is arranged when there does not exist the lens element 17*a* is represented by a light shielding plate 16'.

In the microscopy system 100, the intermediate image S2 is obtained by demagnifying the intermediate image S2' to ½ with the lens array 17, so an aperture diameter of the confocal plate 7 can be reduced in size up to one-half of that in conventional cases. Specifically, for example, a diameter of the aperture 16*a* may be 0.5 Airy units (AU). This permits providing of a higher resolving power due to a reduction in the size of an aperture diameter without a decrease in efficiency of detecting fluorescence.

Further, the lens element 17*a* does not act on an interval between intermediate images while demagnifying the intermediate images, so it does not affect a magnification of the observed object 1 projected onto the camera 30. In other words, the lens array 17 individually demagnifies intermediate images S2 of the plurality of optical spots S1 that are formed in the plurality of apertures 16*a* so that each of the plurality of optical spots S1 is projected onto the camera 30 at a magnification of one-half of the magnification at which the observed object 1 is projected onto the camera 30. This permits a realization of a demagnified projection of an optical spot S1 that is required to realize ISM without using a relay optical system. As a result, it is possible to omit a high-level adjustment task that occurs in the presence of a relay optical system, which permits a great decrease in the difficulty level of an adjustment task. The projection of each of the plurality of optical spots S1 onto the camera 30 at a magnification of one-half of the magnification at which the observed object 1 is projected onto the camera 30 optically realizes processing of correcting a centroid position of pixel data that has been electrically performed in the conventional ISM that is disclosed in, for example, Non Patent Document 1 (C. Müller and J. Enderlein, "Image Scanning Microscopy", Physical Review Letters, Vol. 104, 198101, 2010).

According to the microscopy system 100, ISM can be realized by projecting a plurality of spots S1 on the observed object 1 at a different magnification from that of an image of the observed object 1 without requiring a high-level adjustment task because the lens array 17 is provided in the confocal plate 7. Further, the lens element 17*a* forms an intermediate image S2 by demagnifying the intermediate image S2' of FIG. 3 to ½, wherein the intermediate image S2 is projected as a virtual image of the intermediate image S2'. This results in shortening a distance from the intermediate image S2 to the observed object 1, which permits the microscopy system 100 to have a more compact configuration.

In order to obtain the advantage described above, it is sufficient if intermediate images S2 of the plurality of spots S1 are individually demagnified such that each of the plurality of spots S1 is projected onto the camera 30 at a magnification of one-half of the magnification at which the observed object 1 is projected onto the camera 30. Thus, the microscopy system 100 may use, for example, a confocal plate illustrated in FIG. 4A, 4B, or 4C instead of the confocal plate 7.

A confocal plate 24 illustrated in FIG. 4A, a confocal plate 26 illustrated in FIG. 4B, and a confocal plate 28 illustrated in FIG. 4C are all similar to the confocal plate 7 in including the light shielding plate 16 in which the plurality of apertures 16*a* are formed.

The confocal plate 24 is different from the confocal plate 7 in including a lens array 25 instead of the lens array 17. The lens array 25 has a transparent substrate 25*b* and a plurality of lens elements 25*a* formed on the transparent substrate 25*b*, and the plurality of lens elements 25*a* having a positive power are arranged on the object side of the light shielding plate 16 to cover the plurality of apertures 16*a*.

The confocal plate 26 is different from the confocal plate 7 in including a lens array 27 instead of the lens array 17. The lens array 27 is a so-called lenticular lens having a plurality of lens elements 27*a*. The plurality of lens elements 27*a* each have a positive power and are arranged on the object side of the light shielding plate 16 to cover the plurality of apertures 16*a*.

The confocal plate 28 is different from the confocal plate 7 in including a lens array 29 instead of the lens array 17. The lens array 29 has a plurality of lens elements 29*a* that have a negative power, and the plurality of lens elements 29*a* are arranged on the image side of the light shielding plate 16 to cover the plurality of apertures 16*a*.

In all the confocal plates described above (the confocal plate 24, the confocal plate 26, and the confocal plate 28), the lens array acts such that each of the plurality of optical spots S1 is projected onto the camera 30 at a magnification of one-half of the magnification at which the observed object 1 is projected onto the camera 30.

In FIGS. 4A to 4C, the light shielding plate 16 in which the plurality of apertures 16*a* are formed is applied, but, instead of the light shielding plate 16, a light shielding film may be applied that has the plurality of openings 16*a* and is formed by evaporating a chromium film and the like on each of the transparent substrate 25 in FIG. 4A, the lens array 27 in FIG. 4B, and the lens array 29 in FIG. 4C.

<Second Embodiment>

FIG. 5 illustrates a configuration of a microscopy system 200 according to the present embodiment. FIG. 6 is a block diagram that illustrates a basic configuration of the microscopy system 200 of FIG. 5. Like the microscopy system 100, the microscopy system 200 is a confocal microscopy system and is an image-capturing system that captures an image of the observed object 1 with a high resolving power. The microscopy system 200 is different from the microscopy system 100 in including a scanning optical system 40 instead of the scanning optical system 20.

The scanning optical system 40 is different from the scanning optical system 20 in that an imaging optical system 42 and an image-capturing optical system 43 share a scanning unit 19 and in that it includes a mirror 18. The scanning optical system 40 is similar to the scanning optical system 20 regarding the other points, and irradiates light onto a plurality of spots on the observed object 1 to scan the observed object 1. The scanning unit 19 is a galvanometer mirror that includes a two-sided mirror. The scanning unit 19 is arranged in a position at which an optical path between the confocal plate 7 and the observed object 1 and an optical path between the confocal plate 7 and the camera 30 intersect. The scanning unit 19 is a scanning unit that changes, by using the reflection on one of the sides of the mirror, the positions at which the plurality of apertures 16*a* are projected onto the observed object 1. Further, the scanning unit 19 is a scanning unit that changes, by using the reflection on the other side of the mirror, the positions at which the plurality of apertures 16*a* are projected onto the camera 30.

The microscopy system 200 also permits providing of an advantage similar to that provided by the microscopy system 100. In other words, ISM can be realized by projecting a plurality of spots S1 on the observed object 1 at a different magnification than that of an image of the observed object 1 without requiring a high-level adjustment task because the lens array 17 is provided in the confocal plate 7.

Further, the microscopy system 200 has a configuration similar to an existing confocal microscope, known as a swept field confocal microscope, except for including the confocal plate 7. Thus, it is possible to obtain an advantage similar to that provided by the microscopy system 200 just by replacing the confocal plate of the swept field confocal microscope with the confocal plate 7, which results in easy application to an existing product.

<Third Embodiment>

Figure 7:
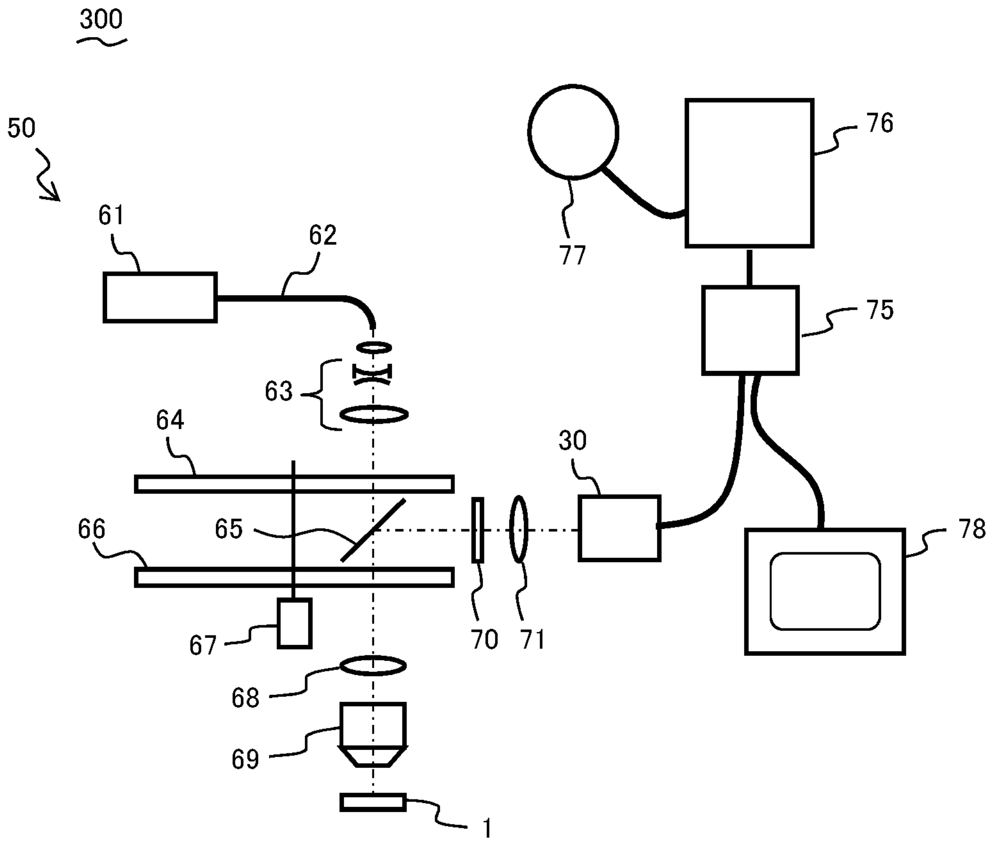
FIG. 7 illustrates a configuration of a microscopy system 300 according to a third embodiment of the present invention.
Figure 9:
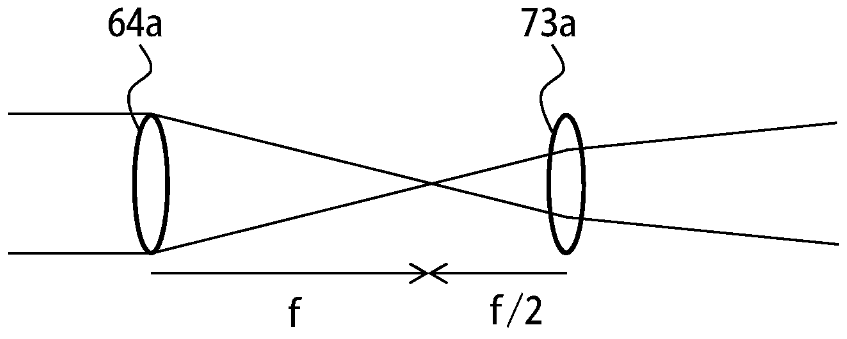
FIG. 9 is a diagram for explaining a positional relationship between a lens array plate 64 and a lens array 73.

FIG. 7 illustrates a configuration of a microscopy system 300 according to the present embodiment. FIG. 8 illustrates a pattern of apertures formed in a confocal plate 66. FIG. 9 is a diagram for explaining a positional relationship between a lens array plate 64 and a lens array 73. FIG. 10 is a block diagram that illustrates a basic configuration of the microscopy system 300 of FIG. 7. The microscopy system 300 is a so-called spinning-disk confocal microscopy system and is an image-capturing system that captures an image of the observed object 1 with a high resolving power.

The microscopy system 300 includes a scanning optical system 50 that irradiates light onto a plurality of spots on the observed object 1 to scan the observed object 1, and the camera 30, which captures an image of the observed object 1. The microscopy system 300 further includes a calculation device 74 (an image processing board 75 and a calculator 76), a storage medium 77 that stores therein various pieces of data, and a display device 78 that displays an image of the observed object 1.

The camera 30 includes, for example, a photodetector such as a scientific CMOS (sCMOS: scientific complementary metal-oxide semiconductor) image sensor. The photodetector of the camera 30 has a plurality of light-receiving elements that are two-dimensionally placed in order on an image surface.

The scanning optical system 50 includes an illumination optical system 51, and a dichroic mirror 65 that splits light into an illumination optical path between a laser 61 that emits excitation light and the observed object 1 and a detection optical path between the observed object 1 and the camera 30. The scanning optical system 50 further includes the confocal plate 66 that is a rotary disk, a motor 67, an imaging optical system 52, and an image-capturing optical system 53. For example, a Nipkow disk can be used as the confocal plate 66.

The illumination optical system 51 includes the laser 61, a single-mode optical fiber 62, a beam expander 63 that expands a beam diameter of excitation light entering through the single-mode optical fiber 62, and the lens array plate 64 that is a rotary disk. The lens array plate 64 is a first lens array that has, on a circular disk, a plurality of lens elements 64*a* having a focal plane in an intermediate image plane situated between the observed object 1 and the camera 30. The lens array plate 64 is configured to collect excitation light in a plurality of apertures 72*a* formed in the confocal plate 66.

The confocal plate 66 includes a light shielding plate 72 in which the plurality of apertures 72*a* are formed, and the lens array 73 (a second lens array) having a plurality of lens elements 73*a* that cover the plurality of apertures 72*a*. The confocal plate 66 has a circular shape as a whole. Each of the plurality of apertures 72*a* is formed in a focal position of a corresponding lens element 64*a*. For example, as illustrated in FIG. 8, the plurality of apertures 72*a* each have a shape of a pinhole with an aperture diameter w, and are aligned with an aperture period p in longitudinal and lateral directions. In order to produce an optical sectioning effect, the aperture period p is designed to be about three times larger than the aperture diameter w.

The light shielding plate 72 is arranged in a focal plane of the plurality of lens elements 64*a*, and rotates with the rotation of the motor 67 such that the plurality of apertures 72*a* move in the intermediate image plane. In other words, the motor 67 is a driver for moving the confocal plate 66 (the light shielding plate 72). The motor 67 also rotates the lens array plate 64 in addition to the confocal plate 66 (the light shielding plate 72). In particular, the motor 67 rotates the lens array plate 64 and the confocal plate 66 so that a relative positional relationship between the lens array plate 64 and the motor 67 does not change. For example, the lens array plate 64 and the confocal plate 66 may be coaxially connected to an axis that rotates with the motor 67. Accordingly, the focal positon of a lens element 64*a* is maintained over an aperture 72*a*. This permits suppressing of the light amount loss of excitation light, and permits irradiating of the observed object 1 with as much excitation light as possible to scan the observed object 1. The lens array plate 64, the dichroic mirror 65, and the confocal plate 66 function as a scanning unit of the microscopy system 300.

The lens array 73 is provided on the light shielding plate 72. The plurality of lens elements 73*a* each having a positive power are arranged on the object side of the plurality of apertures 72*a*. In particular, as illustrated in FIG. 9, the lens array 73 is arranged between the lens array plate 64 and the observed object 1 such that the intermediate image plane is positioned away from the lens array 73 by a distance of one-half of the focal length of a lens element 73*a*. This results in forming, in the intermediate image plane, an intermediate image of an optical spot that is obtained by demagnifying, to ½, that of the optical spot when there does not exist the lens array 73. FIG. 9 illustrates an exemplary arrangement of a lens element 64*a* and a lens element 73*a* when they have the same focal length f.

The imaging optical system 52 includes a tube lens 68 and an objective 69, and is configured to project the apertures 72*a* onto the observed object 1 and to form an intermediate image of the observed object 1 on the confocal plate 66.

The image-capturing optical system 53 includes a block filter 70 that blocks excitation light and an image-capturing lens 71, and is configured to project, onto the camera 30, an intermediate image of the observed object 1 that is formed on the confocal plate 66.

The camera 30 generates confocal image data of the observed object 1 on the basis of an amount of fluorescence detected for a predetermined period of time. A method for generating confocal image data is the same as that in International Publication Pamphlet No. WO 2013/126762.

The image processing board 75 and the calculator 76 are a calculation device that performs image processing on confocal image data generated by the camera 30. The image processing board 75 and the calculator 76 may perform, on confocal image data, digital processing for enhancing a super-resolution component included in the confocal image data so as to enhance a resolution of an image. The super-resolution component refers to a high-frequency component above a cutoff frequency of an imaging optical system. In this digital processing, preferably, a Fourier filter or a convolution filter is used, and more preferably, a sharp filter having a core not less than 3×3 is used, or even more preferably, a sharp filter having a core not less than 5×5 is used.

The storage medium 77 is, for example, a hard disk device, and a medium that stores therein confocal image data generated by the camera 30 and image data on which digital processing has been performed. The display device 78 is, for example, a liquid-crystal display, and displays the confocal image data generated by the camera 30 and the image data on which digital processing has been performed.

In the microscopy system 300, the lens array 73 provided in the confocal plate 66 individually demagnifies intermediate images of the plurality of spots that are formed in the plurality of apertures 72*a* such that each of the plurality of spots is projected onto the camera 30 at a magnification of one-half of the magnification at which the observed object 1 is projected onto the camera 30. Thus, like the microscopy system 100 according to the first embodiment, the microscopy system 300 also permits a realization of ISM by projecting a plurality of spots on the observed object 1 at a different magnification than that of an image of the observed object 1 without requiring a high-level adjustment task.

Further, in the microscopy system 300, the calculation device 74 performs digital processing for enhancing a super-resolution component. Thus, the microscopy system 300 permits a realization of a much higher resolving power.

FIG. 8 illustrates an aperture having a pinhole shape, but the shape of an aperture is not limited to a pinhole shape, but it may be, for example, a linear shape. In that case, the lens array plate 64 is preferably a cylindrical lens array. Further, FIG. 9 illustrates an example in which the lens element 73*a* provided in the lens array 73 is a positive lens. However, the lens element 73*a* may be a negative lens if each of the plurality of spots is projected onto the camera 30 at a magnification of one-half of the magnification at which the observed object 1 is projected onto the camera 30.

<Fourth Embodiment>

Figure 11:
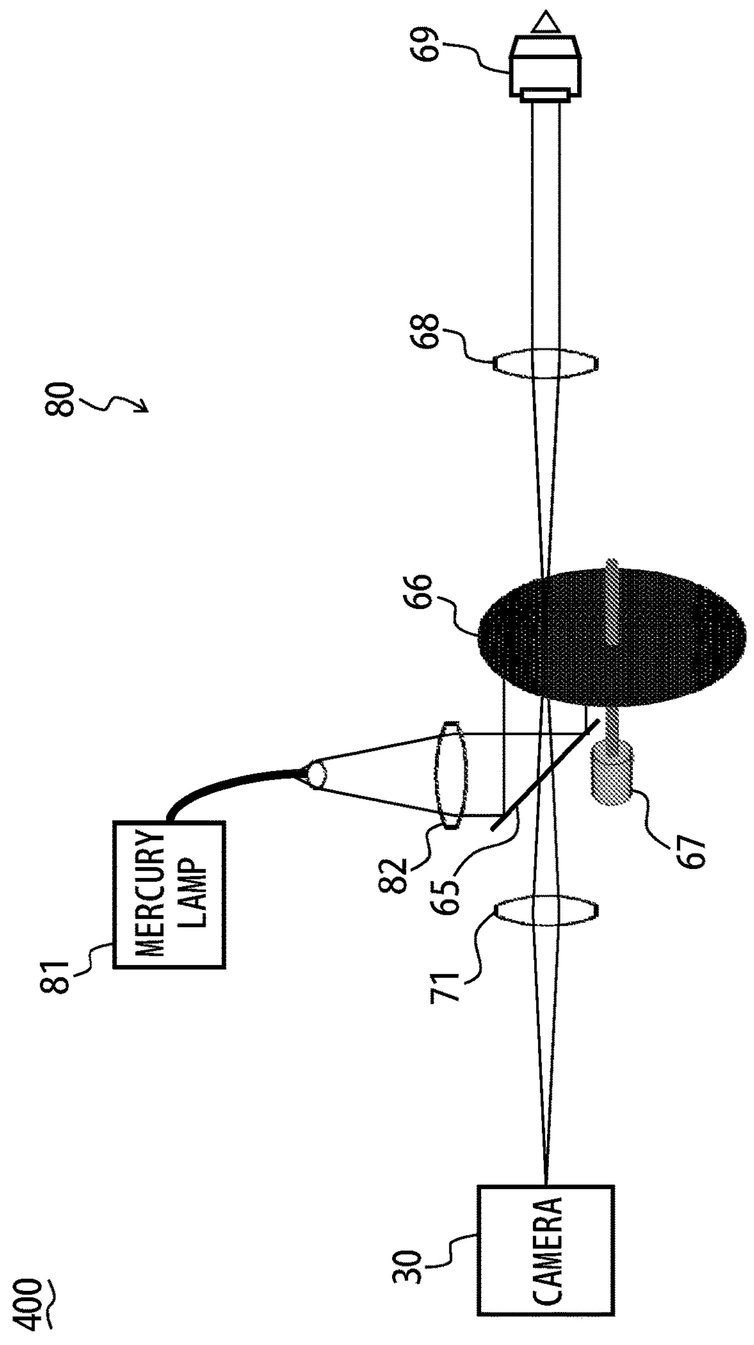
FIG. 11 illustrates a configuration of a microscopy system 400 according to a fourth embodiment of the present invention.

FIG. 11 illustrates a configuration of a microscopy system 400 according to the present embodiment. The microscopy system 400 is a spinning-disk confocal microscopy system and is an image-capturing system that captures an image of the observed object 1 with a high resolving power. In FIG. 11, descriptions of the block filter 70, the image processing board 75, the calculator 76, the storage medium 77, and the display device 78 are omitted, but the microscopy system 400 may include them.

A scanning optical system 80 of the microscopy system 400 is similar to the scanning optical system 50 of the microscopy system 300 except for the following two points. First, the scanning optical system 80 includes a mercury lamp 81 that is an incoherent light source and a collimating lens 82 instead of the laser 61, the single-mode optical fiber 62 and the beam expander 63. Secondly, the scanning optical system 80 does not have the lens array plate 64 that the illumination optical system uses to collect excitation light in the confocal plate 66.

Thus, also in the microscopy system 400, the lens array 73 provided in the confocal plate 66 individually demagnifies intermediate images of the plurality of spots that are formed in the plurality of apertures 72*a* such that each of the plurality of spots is projected onto the camera 30 at a magnification of one-half of the magnification at which the observed object 1 is projected onto the camera 30. Therefore, like the microscopy system 300, the microscopy system 400 also permits a realization of ISM by projecting a plurality of spots on the observed object 1 at a different magnification than that of an image of the observed object 1 without requiring a high-level adjustment task.

<Fifth Embodiment>

Figure 12:
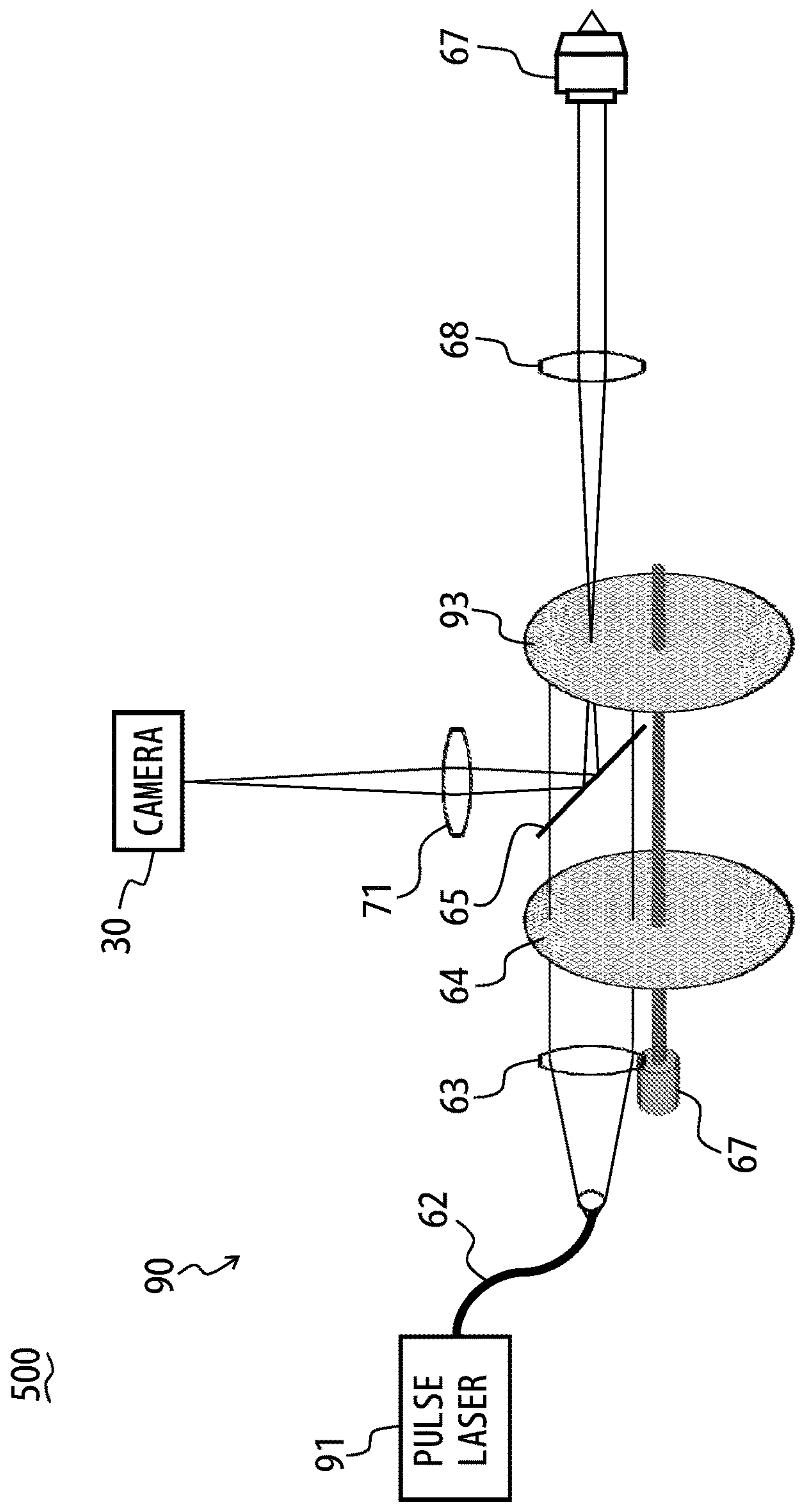
FIG. 12 illustrates a configuration of a microscopy system 500 according to a fifth embodiment of the present invention.
Figure 13:
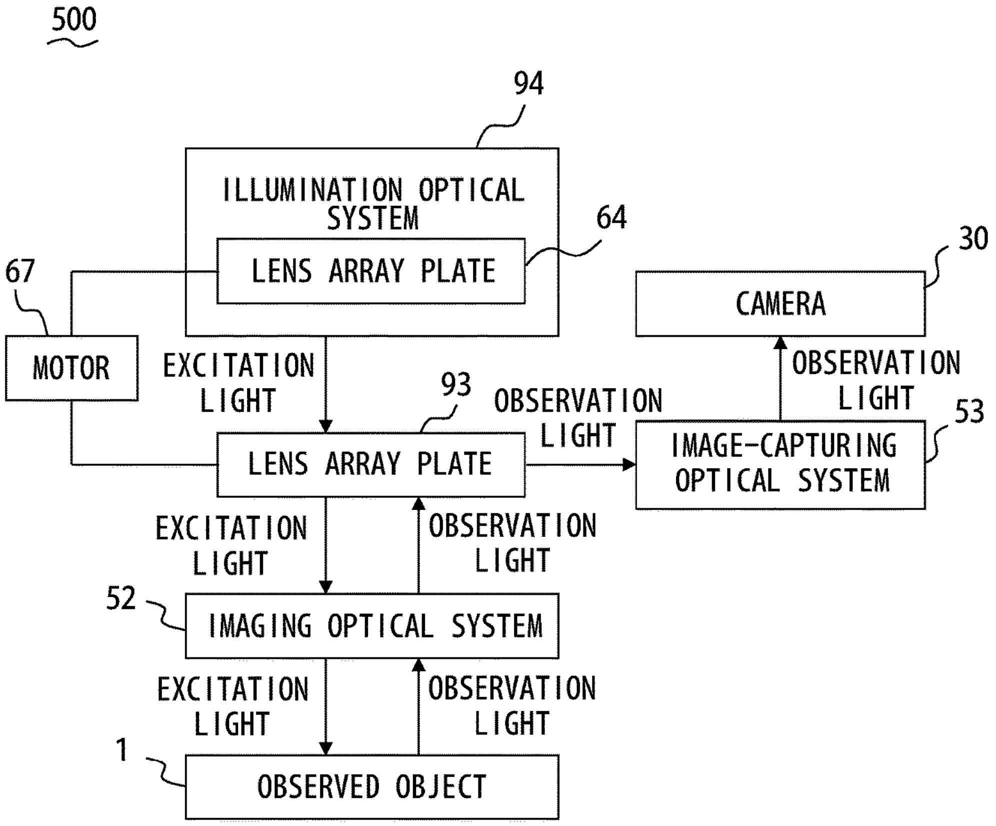
FIG. 13 is a block diagram that illustrates a basic configuration of the microscopy system 500 of FIG. 12.

FIG. 12 illustrates a configuration of a microscopy system 500 according to the present embodiment. FIG. 13 is a block diagram that illustrates a basic configuration of the microscopy system 500 of FIG. 12. The microscopy system 500 is a two-photon excitation microscopy system that is a form of a laser-scanning microscopy system and is an image-capturing system that captures an image of the observed object 1 with a high resolving power. In FIG. 12, descriptions of the block filter 70, the image processing board 75, the calculator 76, the storage medium 77, and the display device 78 are omitted, but the microscopy system 500 may include them.

A scanning optical system 90 of the microscopy system 500 is similar to the scanning optical system 50 of the microscopy system 300 except for including a pulsed laser 91 instead of the laser 61 and including a lens array plate 93 that is a second lens array instead of the confocal plate 66.

The pulsed laser 91 is, for example, an ultrashort pulsed laser with a pulse width on the order of femtoseconds, whose peak power is high. Further, the pulsed laser 91 emits, for example, a laser beam in a near infrared range. The use of the pulsed laser 91 as a light source results in producing a two-photon-excitation phenomenon in the observed object 1 onto which the laser light is irradiated.

The lens array plate 93 has a plurality of lens elements and corresponds to the confocal plate 66 in a state in which the light shielding plate 72 is excluded. The lens array plate 93 is arranged such that an intermediate image plane is positioned away from the lens array plate 93 by a distance of one-half of the focal length of its lens element. This results in forming, in the intermediate image plane, an intermediate image of an optical spot that is obtained by demagnifying, to ½, that of the optical spot when there does not exist the lens array plate 93.

Thus, the microscopy system 500 also permits a realization of ISM by projecting a plurality of spots on the observed object 1 at a different magnification than that of an image of the observed object 1 with a similar level of adjustment task to that of an existing spinning-disk confocal microscopy system.

The embodiments described above are just examples to facilitate understanding of the present invention, and the embodiments of the invention is not limited to these embodiments. Various modifications and alterations maybe made to a scanning microscopy system without departing from the invention specified in the claims. A combination of some of the features in the embodiments described herein may be provided as a single embodiment.

For example, the above-described embodiments have been described using an example in which a lens array individually demagnifies intermediate images of a plurality of optical spots S1 that are formed or that have been formed in a plurality of apertures so that each of the plurality of optical spots S1 is projected onto a photodetector at a magnification of one-half of the magnification at which the observed object is projected onto the photodetector, but the reduction magnification is not limited to ½. ½ is preferable, but a reduction magnification that does not significantly deviate from ½ may be accepted.

Further, for example, the third embodiment to the fifth embodiment have been described using an example in which a lens array or a confocal plate is configured as a rotary disk, but the lens array or the confocal plate may move in a plane perpendicular to an optical axis. Thus, for example, they may be configured to vibrate in a direction perpendicular to the optical axis. Moreover, a plurality of confocal plates may be provided in advance, and may be used for replacing one confocal plate another one as needed. For example, a plurality of confocal plates having aperture diameters or aperture spacings different from one another may be provided in advance, or a confocal plate that is provided with a lens array and a confocal plate that is not provided with a lens array may be provided.

What is claimed is:

1. A scanning microscopy system comprising:

a photodetector that has a plurality of light-receiving elements placed in order on an image surface; and a scanning optical system that irradiates light onto a plurality of spots on an observed object to scan the observed object such that a positional relationship between an image of the observed object and the photodetector is maintained, wherein the scanning optical system includes a confocal plate in which a plurality of apertures are placed in order in an intermediate image plane situated between the observed object and the photodetector and that includes a lens array having a plurality of lens elements that cover the plurality of apertures, and wherein the lens array individually demagnifies intermediate images of the plurality of spots that are formed or that have been formed in the plurality of apertures such that each of the plurality of spots is projected onto the photodetector at a magnification lower than a magnification at which the observed object is projected onto the photodetector.

2. The scanning microscopy system according to claim 1, wherein the plurality of lens elements are arranged on the object side of the plurality of apertures, and each of the plurality of lens elements has a positive power.

3. The scanning microscopy system according to claim 1, wherein the plurality of lens elements are arranged on the image side of the plurality of apertures, and each of the plurality of lens elements has a negative power.

4. The scanning microscopy system according to claim 1, wherein the scanning optical system further includes:

a first scanning unit that is arranged in an optical path between the confocal plate and the observed object and that changes positions at which the plurality of apertures are projected onto the observed object, and a second scanning unit that is arranged in an optical path between the confocal plate and the photodetector and that changes positions at which the plurality of apertures are projected onto the photodetector.

5. The scanning microscopy system according to claim 1, wherein the scanning optical system further includes a scanning unit that is arranged in a position at which an optical path between the confocal plate and the observed object and an optical path between the confocal plate and the photodetector intersect, and that changes positions at which the plurality of apertures are projected onto the observed object, and positions at which the plurality of apertures are projected onto the photodetector.

6. The scanning microscopy system according to claim 1, wherein the scanning optical system further includes a driver that moves the confocal plate such that the plurality of apertures move in the intermediate image plane.

7. The scanning microscopy system according to claim 2, wherein the scanning optical system further includes:

a first scanning unit that is arranged in an optical path between the confocal plate and the observed object and that changes positions at which the plurality of apertures are projected onto the observed object, and a second scanning unit that is arranged in an optical path between the confocal plate and the photodetector and that changes positions at which the plurality of apertures are projected onto the photodetector.

8. The scanning microscopy system according to claim 2, wherein the scanning optical system further includes a scanning unit that is arranged in a position at which an optical path between the confocal plate and the observed object and an optical path between the confocal plate and the photodetector intersect, and that changes positions at which the plurality of apertures are projected onto the observed object, and positions at which the plurality of apertures are projected onto the photodetector.

9. The scanning microscopy system according to claim 2, wherein the scanning optical system further includes a driver that moves the confocal plate such that the plurality of apertures move in the intermediate image plane.

10. The scanning microscopy system according to claim 3, wherein the scanning optical system further includes:

a first scanning unit that is arranged in an optical path between the confocal plate and the observed object and that changes positions at which the plurality of apertures are projected onto the observed object, and a second scanning unit that is arranged in an optical path between the confocal plate and the photodetector and that changes positions at which the plurality of apertures are projected onto the photodetector.

11. The scanning microscopy system according to claim 3, wherein the scanning optical system further includes a scanning unit that is arranged in a position at which an optical path between the confocal plate and the observed object and an optical path between the confocal plate and the photodetector intersect, and that changes positions at which the plurality of apertures are projected onto the observed object, and positions at which the plurality of apertures are projected onto the photodetector.

12. The scanning microscopy system according to claim 3, wherein the scanning optical system further includes a driver that moves the confocal plate such that the plurality of apertures move in the intermediate image plane.

13. The scanning microscopy system according to claim 1, wherein the scanning optical system further includes:

a light source, and a lens array that is arranged in an optical path between the light source and the confocal plate and that collects light from the light source in the plurality of apertures.

14. A scanning microscopy system comprising:

a photodetector that has a plurality of light-receiving elements placed in order on an image surface; and a scanning optical system that irradiates light onto a plurality of spots on an observed object to scan the observed object such that a positional relationship between an image of the observed object and the photodetector is maintained, wherein the scanning optical system includes:

a first lens array that has a plurality of first lens elements each of which has a focal plane in an intermediate image plane situated between the observed object and the photodetector, and a second lens array that is arranged in an optical path between the first lens array and the observed object and that has a plurality of second lens elements, and wherein the second lens array is configured to demagnify intermediate images of the plurality of spots that are formed or that have been formed in the intermediate image plane such that each of the plurality of spots is projected onto the photodetector at a magnification lower than a magnification at which the observed object is projected onto the photodetector.

15. The scanning microscopy system according to claim 14, wherein the second lens array is arranged such that the intermediate image plane is positioned away from the second lens array by a distance of one-half of a focal length of the second lens element.

16. The scanning microscopy system according to claim 14, wherein the scanning optical system further includes a driver that moves the first lens array and the second lens array in directions perpendicular to optical axes of the first lens array and the second lens array, respectively, so that a relative positional relationship between the plurality of first lens elements and the plurality of second lens elements does not change.

17. The scanning microscopy system according to claim 15, wherein the scanning optical system further includes a driver that moves the first lens array and the second lens array in directions perpendicular to optical axes of the first lens array and the second lens array, respectively, so that a relative positional relationship between the plurality of first lens elements and the plurality of second lens elements does not change.

18. The scanning microscopy system according to claim 13, further comprising a second confocal plate that is different from the confocal plate and that is not provided with a lens array, wherein the confocal plate and the second confocal plate are replaceable by each other.

19. The scanning microscopy system according to claim 18, further comprising at least one third confocal plate that is different from the confocal plate, wherein the confocal plate and the at least one third confocal plate are a plurality of confocal plates that have aperture diameters and aperture spacings different from one another or that have aperture diameters or aperture spacings different from one another, and the confocal plate and the at least one third confocal plate are replaceable by one another.

* * * * *